IMAGE CONVERTER

Filed May 27, 1968 2 Sheets-Sheet 1

INVENTORS M. G. BODMER
M. H. CROWELL
E. I. GORDON
F. J. MORRIS
BY
ATTORNEY

United States Patent Office 3,523,208

Patented Aug. 4, 1970

3,523,208

IMAGE CONVERTER

Max G. Bodmer, Short Hills, Merton H. Crowell, Morristown, Eugene I. Gordon, Convent Station, and Francis J. Morris, Plainfield, N.J., assignors to Bell Telephone Laboratories, Incorporated, Murray Hill, N.J., a corporation of New York Filed May 27, 1968, Ser. No. 732,273

Int. Cl. H01j 31/26

U.S. Cl. 315—10 8 Claims

ABSTRACT OF THE DISCLOSURE

The specification describes a modification of the prior art silicon diode array target for video image converters by using, in place of the p-n junctions, devices resembling MIS diodes. A depletion layer for collecting the minority carriers generated by photon absorption is established by the scanning beam at the insulator-semiconductor interface. Isolation is achieved with a thick insulating film between the active regions which effectively limits significant depletion layer formation to those areas below the active regions.

This invention relates to electron beam storage devices for optical information. More specifically it concerns a new semiconductor target structure useful for converting images associated with optical or other photon radiation forms to video signals.

Many forms and modifications of electron beam charge storage devices have been proposed, usually in connection with video transmission. Recently an improved video camera tube has been developed which has met with considerable success and appears destined for widespread commercial use. This device is decreased and claimed in application Ser. No. 605,715 now Pat. No. 3,403,284, filed Dec. 29, 1966 by T. M. Buck, M. H. Crowell and E. I. Gordon, and assigned to the assignee of this case, Bell Telephone Laboratories, Incorporated. This device relies on an array of p-n junctions for localized charge storage. The diodes are charged by a scanning electron beam and each diode is discharged during the frame period to an extent determined by the number of minority carriers reaching the junction from hole-electron pairs generated as a consequence of photon absorption. If the carrier lifetime exceeds (or is a a significant fraction of) the average diffusion time across the target then the charge remaining on a diode when the scanning beam readdresses it is a measure of the localized intensity of the light incident on the target. The scan rate and instantaneous beam position are given by a standard synchronizing signal. The resulting video output can be transmitted in the usual manner to a conventional receiver. This device affords potentially higher sensitivity and spectral response than the ordinary vidicon tube and is not susceptable to "burn-out" as are photoconductive targets.

An alternative target design has now been discovered which bears considerable resemblance to the aforementioned diode-array target but has the significant distinction of employing no p-n junctions. In other respects the structural features are similar and the operation and performance is superficially the same also. The new structure results from the finding that the diffused p-n junctions of the prior art target can be replaced by simpler devices which function like MOS diodes without compromise in video quality and with promise of improvement in certain performance characteristics. The elimination of the diffusion step necessary to form the p-n junctions of the former device is of some consequence in the economics of the fabrication process. It has the added benefit of removing a heating step from the processing. Heating the semiconductor substrate to diffusion temperatures tends to enhance the minority carrier bulk recombination rate which may be disadvantageous to the successful operation of this kind of device. Other implications and advantages of this new design will become evident from the following detailed description. In the drawing:

Figure 1:
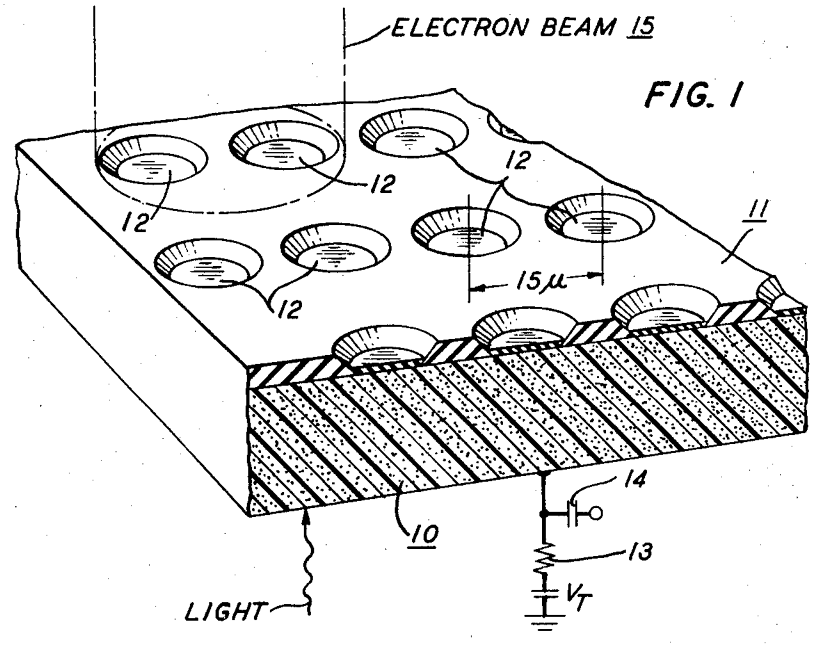
FIG. 1 is a perspective view partly in section of a portion of a target array constructed in accordance with the principles of this invention.

The basic structure requirements of the target device are shown in FIG. 1. The substrate 10 is a thin semiconductor wafer of a given resistivity type. An insulating layer 11 is uniformly applied to the surface of the substrate. An array of active target regions 12 are formed in the layer 11 by standard photolithographic or other appropriate techniques. The regions 12 are covered with an insulating film which is thinner than the insulating film 11. The active regions 12 may alternatively have the same thickness as the film 11 or even a greater thickness depending on other relative characteristics of the film which will be discussed below. The structure of FIG. 1 can be formed in various ways. A uniformly deposited layer 11 can be masked to leave regions 12 exposed. The layer can then be etched through part of its thickness to produce the geometry shown. In some cases it may be desirable for the films 11 and 12 to consist of different insulating materials in which case the localized regions 12 of the original insulating film are etched through to the silicon substrate and the desired insulating material is then deposited to an appropriate thickness within the etched regions. The interface characteristics between the oxide film and semiconductor substrate are important to the performance of the device and this consideration may be important in selecting the appropriate fabrication procedure. Obviously, surface preparation is easier and more effective on a planar surface so that in some cases it may be preferred to form the insulator-semiconductor interface over the entire substrate surface and leave this interface intact during subsequent processing to form the active regions.

The substrate 10 can be any of a variety of semiconductors. For detecting light radiation in the visible spectrum silicon is well suited. The semiconductor should effectively absorb radiation over the wavelength band of interest. Whereas this description is oriented toward conversion of optical images the device of this invention can convert I.R., U.V., or X-ray radiation by appropriate selection of the substrate 10. For instance, gallium arsenide is useful I.R. absorbers and gold can be used for X-ray targets. The thickness of the substrate in the case of a silicon target for storing visible light radiation images is preferably in the range of $5\mu$ to $30\mu$. This dimension is sufficiently thin so that a support ring at the perimeter of the target is generally provided. The outer support rim is conveniently integral with the substrate but many times its thickness. In the preferred embodiment of the invention the substrate 10 is n-type silicon having a resistivity of 0.1 to 10Ω-cm. The properties of the insulating films 11 and 12 will be described below. The target voltage (with respect to the electron beam potential) appears across resistor 13. The output signal is taken between capacitor 14 and ground. The scanning electron beam is shown schematically as 15. This beam is normally incident on several active regions simultaneously (beam diameter> spacing between active regions). This avoids alignment problems and tends to average the response of several regions.

The operation of the target of FIG. 1 will be described with reference to the single active region 12 appearing in the schematic diagram of FIG. 2. The substrate 10 and the two insulating films 11 and 12 are essentially as they appear in FIG. 1. When the scanning electron beam is incident on the insulating films, the surface of both films is charged essentially to the potential of the electron beam cathode, cathode ground in this case. The presence of the electron charge on the insulator creates a depletion layer in the semiconductor body 10. The extent of the depletion layer will be greater under the thin insulator than under the thick insulator 11.

Light radiation (indicated schematically by the wavy arrows on the bottom surface of the substrate 10) is absorbed by the semiconductor 10 with the creation of hole-electron pairs as shown. The minority carriers drift under the influence of the field and are collected by the larger depletion layer where an inversion layer forms. The magnitude of the charge represented by this inversion layer is a function of the number of minority carriers generated, which in turn is dependent on the integrated intensity of the light incident on the localized area represented by the target segment shown in the figure. As the charge at the insulator-semiconductor accumulates, the depletion layer collapses in proportion to the minority charge density. The foregoing occurs within the frame period, and when the electron beam readdresses this position in the target the depletion layer corresponding to the target voltage is re-established producing a video signal across the substrate 10.

This preliminary description of the function of the device is rigorously expanded by the following:

The scanning beam charges the surface of both layers 11 and 12 to cathode potential. At the instant of charging, before a positive charge inversion layer begins to appear at the silicon-insulating film interface, the relevant parameters of the two regions are: the insulating film surface charge per unit area, $-\sigma_0$; the voltave across the film, $$V_{10}=\sigma_0(d_1/\epsilon_1\epsilon_0)=\sigma_0/C_1 \quad (1)$$

in which $d_1$ is the thickness of the film, $\epsilon_1$ the dielectric constant of the film, and $\epsilon_0$ is the vacuum permittivity; the film capacity per unit area $$C_1=\epsilon_1\epsilon_0/d_1 \quad (2)$$

the voltage across the depletion region, $$V_{20}=\sigma^2{}_0/2n_f e\epsilon_2\epsilon_0=\sigma_0/2C_2 \quad (3)$$

in which $n_f$ is the net fixed charge in the silicon, $e$ is the electron charge and $\epsilon_2$ the dielectric constant; and finally the dynamic capacity per unit area of the depletion region $$C_2=n_f e\epsilon_2\epsilon_0/\sigma_0=\epsilon_2\epsilon_0/d_{20} \quad (4)$$

in which $d_{20}$ is the thickness of the depletion region $$d_{20}=\sigma_0/n_f e \quad (5)$$

A point to remember for future reference is that by design, $C_2 \ll C_1$. The total voltage from the insulating film surface to the depletion region boundary is $$V_{10}+V_{20}=\sigma_0(1/C_1+½C_2)=V_T \quad (6)$$

Since the beam charges the surface to cathode potential, the total voltage must equal the target supply voltage $V_T$.

Charge will reach the interface from within the depletion region by virtue of thermal or optical generation of holes. The rate of hole accumulation per unit area under the thin insulator interface is denoted as $j_g$ and will depend on the local light intensity and dark current density. Charge will also leak from the surface of the thin insulator to the interface by virtue of conduction through the film, determined by the instantaneous voltage across the film, $V_1$. The leakage current density is denoted by $j_l(V_1)$. The net rate at which positive charge density, $\Sigma$, accumulates at the interface is $$j_g-j_l(V_1)$$

After each scan of the electron beam the insulator surface is brought back to cathode potential and the surface charge density $-\sigma$ has the magnitude $$\sigma \approx \sigma_0+\Sigma(1-C_{20}/C_{10}) \quad (7)$$

to within terms of order $(C_2/C_1)^2$. It is assumed also that $\Sigma/\sigma_0$ is not extremely large. The voltage across the insulator $$V_1=\sigma/C_1 \quad (8)$$

eventually must achieve a value such that $j_l(V_1)=j_g$ which implicitly defines an equilibrium value of $\Sigma$. It will be seen later that the maximum tolerable value of $\Sigma$ is such that the voltage across the thin insulator should not exceed the voltage across the thick oxide, otherwise isolation is lost. In practice, this implies that the total range of $V_1$ is not more than 5:1. For this reason $j_l(V_1)$ must be a very rapidly increasing function of $V_1$ to accommodate the large range in $j_g$ that occurs in practice.

When the interface charge density, $\Sigma$, increases as a result of generation current by an amount $\Delta\Sigma$, so that the surface potential rises, the electron beam, in bringing the surface back to cathode potential, compensates by adding a negative surface charge density of magnitude $$\Delta\sigma=\Delta\Sigma(1-C_2/C_1) \quad \text{(generation current)} \quad (9)$$

as follows from Equation 7. When $\Sigma$ is reduced, as a result of leakage in the insulator, by an amount $-\Delta\Sigma$, the surface charge density increases positively by an amount $\Delta\Sigma$. The net change in potential is smaller in this case because the changes tend to balance. The electron beam, in bringing the surface back to cathode potential, componsates by adding a negative surface charge density of magnitude $$\Delta\sigma=\underbrace{+\Delta\Sigma}_{\text{surface change}}-\underbrace{\Delta\Sigma(1-C_2/C_1)}_{\text{interface change}}=\Delta\Sigma C_2/C_1 \quad \text{(leakage current(} \quad (10)$$

Thus the video signal resulting from generation current $j_g$ and leakage current $j_l$ is $$j_v=G[j_g(1-C_2/C_1)+j_l C_2/C_1] \quad (11)$$

The geometrical factor $G=(\tau_f/\tau_r)R$, in which the factor $\tau_f/\tau_r$ is just the ratio of the integration or frame time to the raster scan time. Typically the ratio is 1.2 because of retrace and blanking. The factor R is the area of the thin insulator relative to the target area, typically 1/4. When equilibrium is achieved such that $j_l=j_g$ then $j_v=j_g G$.

In the absence of light $j_g$ equals the so-called dark current density of the target, $j_D$. In dark equilibrium $j_l=j_D$. Since the interface charge density $\Sigma$ has a limiting value, which determines the maximum allowable video signal, it is desirable that $\Sigma \approx 0$ in the dark. This establishes the requirement that $j_l(V_{10})$ should not be significantly less than $j_D$. When $j_l$ exceeds $j_D$ and $\Sigma=0$ the excess leakage charge appearing at the interface cannot recombine and will be swept across the depletion region. In this case the video signal will have the value $j_l G > j_D G$. For these reasons the optimum value of $V_{10}$ is established by the requirement $j_l(V_{10}) \approx j_D$. Experimentally this condition should be simple to observe. This value of $V_1$ will be referred to as the threshold or zero inversion layer value.

When light is incident on an area of the target establishing a particular value of $j_g$, the signal output will not achieve its full equilibrium value until the inversion layer builds up to allow $j_l=j_g$. The fractional difference from the full value will be less than $C_2/C_1 \ll 1$. Thus the observable lag in buildup should be very small. When the target area achieves equilibrium and the light is removed so that $j_g=j_D$, $j_l$ will decay from its value $j_g$ as the interface charge $\Sigma$ is dissipated. Thus a fractional lag less than $C_2/C_1 \ll 1$ will result. The length of time required to achieve equilibrium, either in buildup or decay, will depend on how rapidly $j_1(V_1)$ changes with changes in $V_1$. The stronger the dependence, the smaller is $\Sigma$ for a given equilibrium condition and the more rapidly equilibrium is achieved. Nevertheless, the resulting lag signals will always be limited by $C_2/C_1 \ll 1$. Despite the fact that the magnitude is small, a long lasting lag could be quite noticeable. This puts a premium on having $j_1(V_1)$ vary rapidly with changes in $V_1$.

An additional lag will result from the inability of the electron beam to bring the insulator surface precisely back to cathode potential. This deficiency, which results from poor beam landing efficiency at low approach energies, is common to all vidicon-type camera tubes. A typical value for this type of lag is 5–10 percent.

The requirement that the leakage current in the film 12 varies rapidly with voltage can be met by choosing an insulator which exhibits non-ohmic behavior. This can be defined simply by the equation:

$$I \propto V^{\gamma}$$

where $\gamma$ exceeds 1 and preferably exceeds ten. One category of insulating materials capable of this behavior are described as evidencing an internal Schottky effect called the Poole-Frenkel effect. Examples of these materials are silicon nitride and boron nitride. Similar effects are attributed to $Al_2O_3$, $Ta_2O_5$ and $SiO_x$ where $x$ is less than 2 (see Journal of Applied Physics, 37, 499, 1966). Non-ohmic conduction in those materials is realized at high field values of the order of $10^6$ volts/cm. which is a convenient value for the device described here.

Assuming that conduction in the thin insulator is according to the Poole-Frenkel effect then the current density $j_1$ can be expressed as:

$$j_1 = (E_2/\rho_1) \exp \beta E_1^{1/2} \qquad (12)$$

in which $$\beta = (e/kT)(e/\pi\epsilon_1\epsilon_0)^{1/2}$$

$E_1$ is the electric field in the insulator, $\rho_1$ characterizes the conduction property of the material and has the units of resistivity, $k$ is the Boltzman constant and T is the temperature.

If the threshold field is denoted as $E_{10} = V_{10}/d_1$ and the threshold leakage current density, which equals the dark current density, is denoted at $j_D$, then at equilibrium with a light generated current density $j_g$, one can write $$j_g/j_D = (E_1/E_{10}) \exp \beta (E_1^{1/2} - E_{10}^{1/2}) \qquad (13)$$

As will be seen shortly, $E_1$ can exceed $E_{10}$ by a factor of 6 without loss of isolation. However, even an increase of only 1.5 times the value, taking $E_{10} = 10^6$ volts/cm. and the measured value $\beta = 1.77 \times 10^{-2}$ (volts/cm.)$^{-1/2}$ (corresponding to $\epsilon_1 = 4$), yields $j_g/j_D = 75$ which allows a light to dark ratio or dynamic range which is more than adequate for most applications.

For a target with a thermal regeneration current of 5 nanoamperes/cm.² and an area ratio of thin insulator to total area of 1/4, the required leakage in the insulator is 20 nanoamperes/cm.² with a threshold field of $E_{10} = 10^6$ volts/cm. The measured value at the same field in films of boron nitride is 24 nanoamperes/cm.².

The following description sets forth certain exemplary or optimized conditions for the operation of a device constructed according to the invention. The peak output signal level, as a compromise among parameters such as available beam charging current, preamplifier noise levels, target size, light levels, and cost and size of optics, is typically 100 nanoamperes/cm.² within a factor of two. To achieve this level of output video current requires an accumulation of charge, resulting from generation current to the interface, of $$\Delta\Sigma = 1.33 \times 10^{-4} \text{ coulombs/m.}^2$$

per $\frac{1}{30}$ sec. frame time assuming an area ratio of 1/4. This charge accumulation (prior to compensation by the scanning beam) reduces the voltage across the depletion region. The change when $\Sigma$ is negligible, denoted by $\Delta V_2$, is given by $$\Delta V_2 = -(\Delta\Sigma/C_2)(1 - \tfrac{1}{2}\Delta\Sigma/\sigma_0)$$

Thus when $\Delta\Sigma/\sigma_0$ is about unity corresponding to complete collapse of the depletion region, the effective charging capacity is $2C_2$. When $\Delta\Sigma/\sigma_0 \ll 1$, as is the case here, the effective capacity is $C_2$. The surface potential changes by an amount $-\Delta V_2$ as the charge $\Delta\Sigma$ appears at the interface. The maximum desirable value of $-\Delta V_2$ is +5 volts; higher voltages would distort the trajectory of the impinging electron beam and cause effects referred to as "beam bending." This defines the appropriate value of $C_2 \approx -\Delta\Sigma/\Delta V_2$ or $$C_2 = 1.33 \times 10^{-4}/5 = 2.7 \times 10^{-5} \text{ farads/m.}^2$$

The average target capacity is consequently 660 picofarads/cm.². From Equation 4 the required depletion layer thickness in silicon is $d_{20} = 3.6$ microns.

The insulator in the thin areas is chosen so that the threshold conduction field is $10^6$ volts/cm. If the dielectric constant of the insulator is about 4 then the highest field in the depletion region will be about $3.3 \times 10^5$ volts/cm. which is below the $4\text{–}6 \times 10^5$ volt/cm. breakdown field strength of silicon. With an insulator field of $10^6$ volt/cm. the required surface charge density is $$\sigma_0 = 3.5 \times 10^{-3} \text{ coul./m.}^2$$

which exceeds the maximum value of $\Delta\Sigma$ by a factor of 20. If the insulator film thickness is $$d_1 = 500 \text{ A.}$$

and the dielectric constant is 4, then according to Equation 6 the insulator film capacity is $$C_1 = 7.1 \times 10^{-4} \text{ farads/m.}^2$$

and $C_1/C_2 = 26.3$. Then $$V_{10} = 5 \text{ volts,}$$
$$V_{20} = 65.4 \text{ volts, and}$$
$$V_T = 70.4 \text{ volts}$$

From Equation 5 $n_f = 6 \times 10^{15}$ cm.$^{-3}$ which corresponds to a silicon resistivity of 1Ω-cm.

Considering the thick insulating film 11 and denoting the parameters corresponding to those of film 12 by prime characters, the relationship is the following:

$$V_T = \sigma[(d'_1/d_1)(\epsilon_1/'\epsilon_1/C_1 + (\sigma'/\sigma_0)/2C_2]$$

which yields the solution $$\sigma'/\sigma_0 = -(d'_1/d_1)(\epsilon_1/\epsilon'_1)(C_2/C_1) + [(C_2/C_1)^2(d'_1/d_1)^2(\epsilon_1/\epsilon'_1)^2 + 1 + 2C_2/C_1]^{1/2}$$

Assuming $(d'_1/d_1)(\epsilon_1/\epsilon'_1) > 1$, the surface charge density on the thick areas is always less than on the thin insulator areas. The voltage across the thick oxide film is $V'_1 = \sigma'_2 d'_1/\epsilon'_1\epsilon_0$ or $$V'_1 = V'_{10}(d'_1/d_1)(\epsilon_1/\epsilon'_1)\sigma'/\sigma_0$$

and it can be seen that $V'_1 > V_{10}$ for $(d'_1/d_1)(\epsilon_1/\epsilon'_1) > 1$. For the example given with $C_1/C_2 = 26.3$, $d'_1 = 5000$ A., $d_1 = 500$ A., $\epsilon'_1 = 4$, $\epsilon_1 = 4$, it follows that $(d'_1/d_1)(\epsilon_1/\epsilon'_1) = 10$ and $\sigma'/\sigma_0 = 0.73$. Thus $V'_1/V_{10} = 7.3$. For $V_{10} = 5$ volts, $V'_1 = 36.5$ volts, and $V'_2 = 33.9$ volts as compared to $V_{20} = 65.4$. The potential difference along the interface at zero signal is therefore 31.5 volts; corresponding depletion layer fields are of order $5 \times 10^4$ volts/cm.

The condition that $$\left(\frac{d_1'}{d_1}\right)\left(\frac{\epsilon_1}{\epsilon_1'}\right)>1$$

to preserve isolation, can be expressed by:

$$\frac{d_1'}{\epsilon_1'}>\frac{d_1}{\epsilon_1}$$

Figure 2:
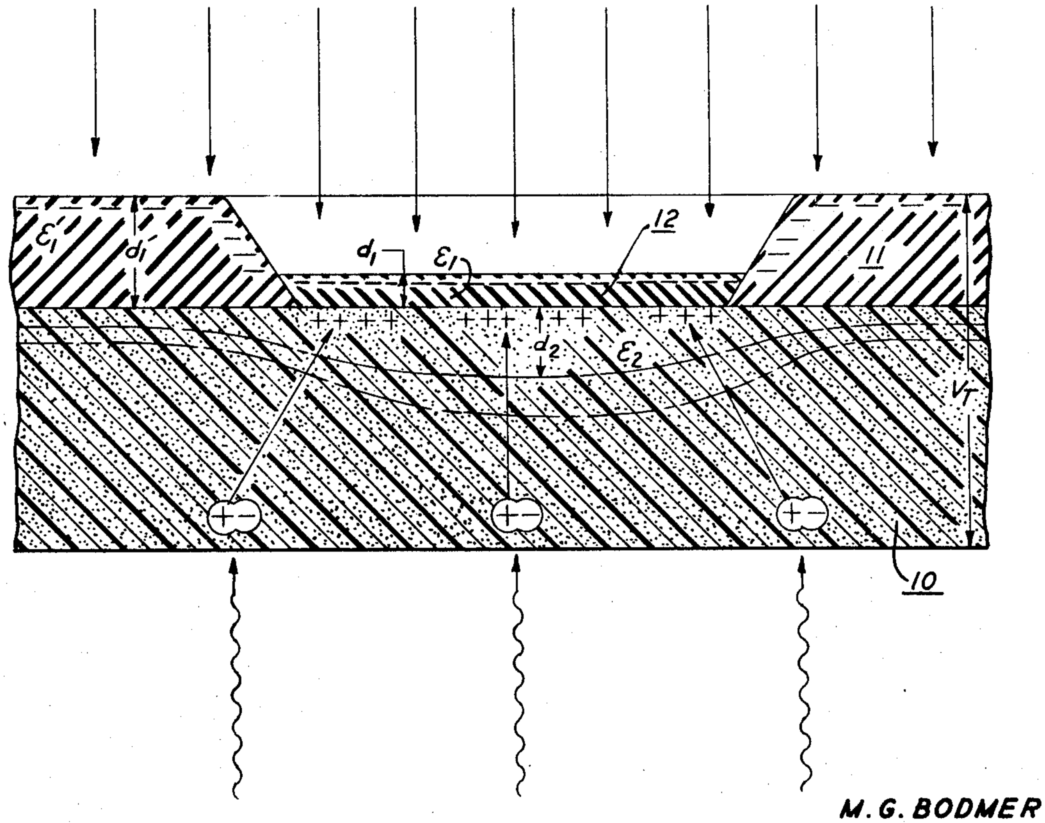
FIG. 2 is a schematic front section of a portion of the device which aids in the description of its operation appearing below.

This prescription, in the usual case where $\epsilon_1$ and $\epsilon'_1$ are comparable in size, requires that the layer 11 be thicker than the layer 12 as shown in FIGS. 1 and 2. However, $\epsilon_1$ and $\epsilon'_1$ can be selected so that the layer 12 is thicker than layer 11, an unlikely but possible configuration, or the layers can be the same thickness. The latter design suggests the possiblity of depositing a uniform film over the entire surface and modifying the properties of the active regions 12 or the passive layer 11 by selective diffusion or ion bombardment. The expression given above defines the critical relationship for the general case and the previous allusions to thick and thin insulating films were convenient for the specific description but are not intended as limiting.

Figure 3:
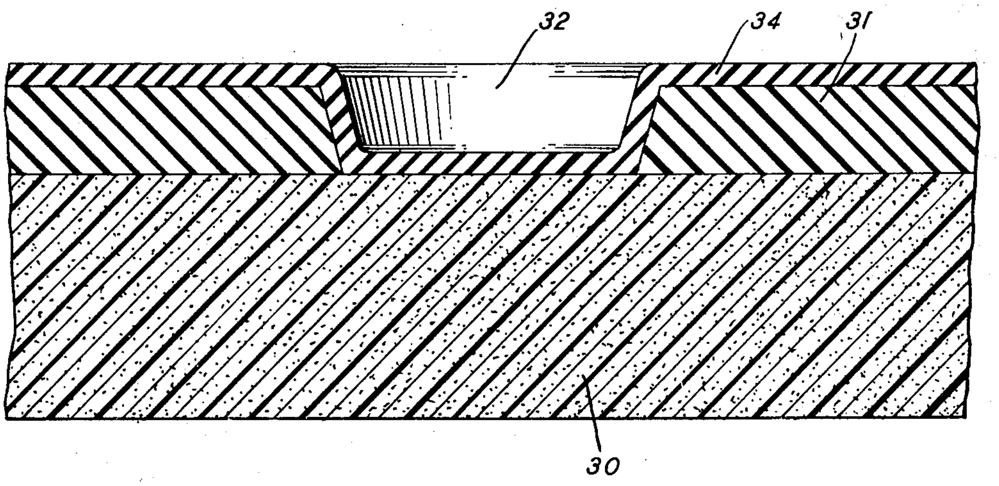
FIG. 3 is a front section of a portion of a device according to this invention illustrating a preferred construction.

Several alternatives for fabricating a device of this invention are possible which include those mentioned earlier. The design shown in FIG. 3 is one preferred form recommended by convenience in its manufatcure. The structure resembles that of FIG. 1 with substrate 30, insulating film 31 and active regions 32, but in this case the active regions are covered by an insulating film 34 which is deposited over the entire surface of the target. Evaporation, plasma deposition or reactive sputtering techniques, all of wihch are known in the art, can be used to deposit the films.

Figure 4:
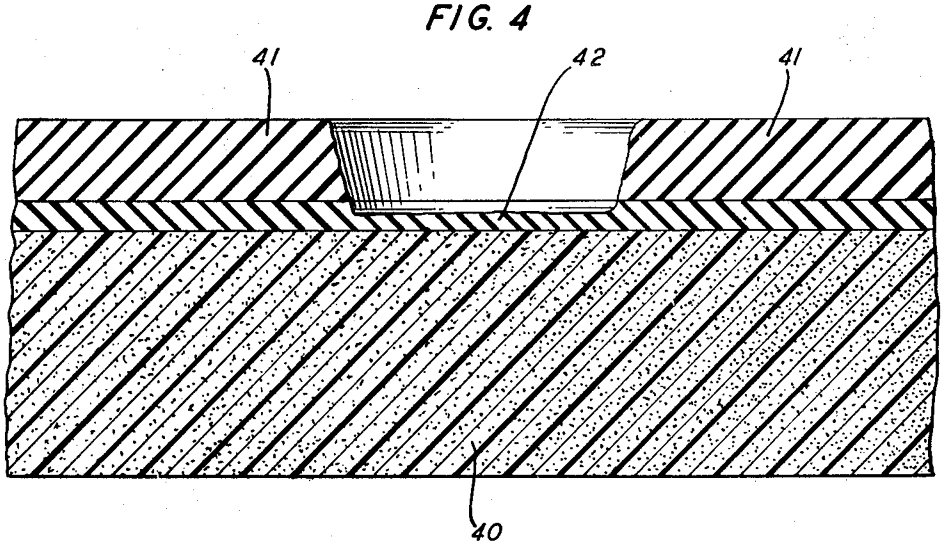
FIG. 4 is a front section similar to FIG. 3 showing another preferred embodiment.

An alternative structure is shown in FIG. 4. In this case the thin insulating film is deposited over the entire surface of the target 40 and the isolating film 41 is formed on selected portions of the film 42 by selective etching. The actual sequence of steps would be to deposit both films and to selectively etch away the top film. While the figure indicates that the entire thickness of layer 41 has been removed from the exposed regions it would only be essential to remove a major portion of this thickness. This design has the advantage of better control over the surface states since the surface preparation occurs on a planar surface. The surface charge density between the insulating film covering the active regions and the substrate should be less than $\approx 10^{12}$ charges/cm.$^2$.

The foregoing description sets forth basic design features. Modifications in the target design can be made within the scope of this invention. For instance, it is advantageous to diffuse a thin phosphorous $n^+$ layer into the surface of the target exposed to the image to provide ohmic contact, low surface recombination velocity for holes, and impurity gettering to increase bulk lifetime. The surface of the isolating insulator film can be covered with a metal or semi-insulating film to dissipate unwanted charge accumulation. In this connection see application of M. H. Crowell, J. V. Dalton, E. I. Gordon and E. F. Labuda Ser. No. 641,257, filed May 25, 1967 and assigned to the assignee of this invention, Bell Telephone Laboratories, Incorporated.

Various additional modifications and extensions of this invention will become apparent to those skilled in the art. All such variations and deviations which basically rely on the teachings through which this invention has advanced the art are properly considered within the spirit and scope of this invention.

What is claimed is:

1. An electron beam storage device comprising in combination:

a target structure comprising a thin semiconductive wafer of uniform conductivity type, a first insulating film covering the major portion of the wafer except for an array of spaced-apart active target regions, a second insulating film covering at least the active target regions, the relative thickness of the insulating material over the first region compared to that over the second region, $d_1/d_2$, and their relative dielectric constants, $\epsilon_1/\epsilon_2$, being related by the expression:

$$\frac{d_1}{d_2}<\frac{\epsilon_1}{\epsilon_2}$$

means for biasing the surface of the said second insulating film with respect to the bulk of the semiconductor wafer so as to establish a depletion layer in said wafer beneath said second insulating regions, said biasing means comprising means for establishing an electron beam and for scanning controlled portions of the target structure, and electrode means associated with the target structure for detecting changes in the voltage across the depletion layer and the second insulating film as the result of charge accumulation in the depletion region.

2. The target structure of claim 1 in which the first and second insulating film comprise the same material with the thickness of the first film being greater than the thickness of the second film.

3. The target structure of claim 1 in which the second film comprises a material in which the conduction behavior at high fields is defined by the relationship $$I \propto V^{\gamma}$$

where I is the current through the film, V is the voltage across the film and $\gamma$ is greater than ten.

4. The target structure of claim 3 in which the material is selected from the group consisting of silicon nitride, boron nitride, aluminum oxide, tantalum oxide and $SiO_x$ where $x$ is less than two.

5. The target structure of claim 1 wherein the wafer is silicon.

6. The target structure of claim 5 wherein the material of the first insulating film is selected from the group consisting of SiN and $SiO_2$ and the second insulating film comprises boron nitride.

7. The target structure of claim 6 wherein the first insulating film has a thickness of the order of 5000 A. and the second insulating film has a thickness of the order of 500 A.

8. The target structure of claim 5 wherein the silicon wafer has a resistivity in the range of one ohm cm. to 100 ohm cm.

References Cited

UNITED STATES PATENTS 3,419,746 12/1968 Crowell et al. -------- 315—10

RODNEY D. BENNETT, Jr., Primary Examiner

J. G. BAXTER, Assistant Examiner

U.S. Cl. X.R.

313—65, 66

UNITED STATES PATENT OFFICE
CERTIFICATE OF CORRECTION

Patent No. 3,523,208 Dated August 4, 1970

Inventor(s) Max G. Bodmer et al.

It is certified that error appears in the above-identified patent and that said Letters Patent are hereby corrected as shown below:

In claim 1, that portion of the equation reading "<" should read -- > --.

Signed and sealed this 31st day of August 1971.

(SEAL)
Attest:

EDWARD M.FLETCHER,JR.
Attesting Officer

WILLIAM E. SCHUYLER, JR.
Commissioner of Patents